mary Examiner

United States Patent [19]
McDaniel et al.

[11] 4,177,162
[45] Dec. 4, 1979

[54] SULFIDING AND REOXIDATION OF CHROMIUM CATALYST

[75] Inventors: Max P. McDaniel; Melvin B. Welch, both of Bartlesville, Okla.

[73] Assignee: Phillips Petroleum Company, Bartlesville, Okla.

[21] Appl. No.: 857,556

[22] Filed: Dec. 5, 1977

[51] Int. Cl.$^2$ .................. B01J 27/02; B01J 31/02; B01J 31/12
[52] U.S. Cl. .................. 252/439; 252/430; 252/428; 252/431 R; 252/431 C; 526/100; 526/106; 526/130
[58] Field of Search .............. 252/428, 431 R, 431 C, 252/439; 526/100, 106, 130

[56] References Cited
U.S. PATENT DOCUMENTS

| | | | |
|---|---|---|---|
| 2,726,231 | 12/1955 | Field et al. | 260/88.1 |
| 3,349,067 | 10/1967 | Hill | 526/106 X |
| 3,756,998 | 9/1973 | Karopinka | 526/130 |
| 3,812,058 | 5/1974 | Nasser | 252/458 |
| 3,932,285 | 1/1976 | Ceprini et al. | 252/431 C X |
| 3,953,413 | 4/1976 | Hwang et al. | 252/431 R X |
| 3,986,983 | 10/1976 | Hoff et al. | 252/428 |
| 4,042,770 | 8/1977 | Bachl et al. | 526/106 |
| 4,054,538 | 10/1977 | Johnson et al. | 252/428 |

*Primary Examiner*—Delbert E. Gantz
*Assistant Examiner*—William G. Wright

[57] ABSTRACT

High melt flow olefin polymers suitable for such applications as injection molding, and the like requiring a narrow molecular weight distribution are produced using a catalyst made by treating a chromium catalyst on a silica-containing base with a sulfur-containing material, and thereafter reoxidizing.

17 Claims, No Drawings

SULFIDING AND REOXIDATION OF CHROMIUM CATALYST

BACKGROUND OF THE INVENTION

This invention relates to the activation of chromium-containing olefin polymerization catalysts.

Supported chromium oxide catalysts can be used to prepare olefin polymers in a hydrocarbon solution to give a product having excellent characteristics from many standpoints. Supported chromium oxide catalysts can also be used to prepare olefin polymers in a slurry system wherein the polymer is produced in the form of small particles of solid material suspended in a diluent. This process, frequently referred to as a particle-form process, has the advantage of being less complex. However, certain control operations which are easily carried out in the solution process are considerably more difficult than the particle-form process. For instance, in the solution process, control of the molecular weight can be effected by changing the temperature with lower molecular weight (higher melt flow) being obtained at the higher temperatures. However, in the slurry process, this technique is inherently limited since any effort to increase the melt flow to any appreciable extent by increasing temperature would cause the polymer to go into solution and thus destroy this slurry or particle-form process.

SUMMARY OF THE INVENTION

It is an object of this invention to provide a catalyst capable of giving high melt flow polymer; it is a further object of this invention to provide a catalyst suitable for use in slurry polymerization systems; it is a further object of this invention to provide an improved method of activating a chromium-containing catalyst; it is yet a further object of this invention to provide a catalyst capable of giving high activity in addition to high melt flow and narrow molecular weight distribution, and it is still yet a further object of this invention to provide a catalyst capable of giving polymer suitable for injection molding and other applications requiring high melt flow and narrow molecular weight distribution.

In accordance with this invention, a chromium catalyst on a silica-containing base is contacted with a sulfur-containing ambient and thereafter reoxidized.

DESCRIPTION OF THE PREFERRED EMBODIMENTS

The base can be any silica-containing material as broadly disclosed in Hogan et al, U.S. Pat. No. 2,825,721 (Mar. 4, 1958), the disclosure of which is hereby incorporated by reference. The base can contain, if desired, from 0.1 to 20 weight percent of materials other than silica, such as alumina as is known in the art. The chromium-containing silica base catalyst is preferably a cogel, that is, a catalyst produced by coprecipitating silica and a titanium-containing compound. Production of such cogels is described in Dietz, U.S. Pat. No. 3,887,494 (June 3, 1975), the disclosure of which is hereby incorporated by reference. Cogels can be formed, for instance, by adding a titanium compound to a mineral acid, introducing an alkali metal silicate into the acid containing said titanium compound to form a hydrogel, aging the hydrogel for greater than one hour, washing the thus aged hydrogel to produce a substantially alkali metal free hydrogel, forming a mixture comprising the thus washed hydrogel and a normally liquid oxygen-containing water soluble organic compound, and separating said organic compound and water from said mixture to form a xerogel.

The catalyst contains chromium in an amount generally within the range of 0.001 to 10, preferably 0.1 to 5, more preferably about 0.5 to 1 weight percent based on the weight of the silica-containing base. The chromium compound can be incorporated as known in the art. For instance, a hydrocarbon solution of a material such as tertiary butyl chromate can be used to impregnate the xerogel or an aqueous solution of a chromium compound such as chromium trioxide or chromium acetate can be added to the hydrogel before drying, or chromium can be coprecipitated along with the silica and titanium. Anhydrous hydrocarbon solutions of $\pi$-bonded organochromium compounds such as diarene chromium compounds or biscyclopentadienyl chromium II can be used. In U.S. Pat. Nos. 3,976,632 (Dec. 4, 1974); 3,349,067 (Oct. 24, 1967) and 3,709,853 (Jan. 9, 1973), the disclosures of which are hereby incorporated by reference, are disclosures of suitable chromium compounds.

As will be described in more detail hereinbelow, the chromium at the time it is contacted with the sulfur is at least partially, preferably predominantly in the hexavalent state. This can be achieved either by an air oxidation as will be described hereinbelow in greater detail or by incorporating the chromium initially simply by introducing the chromium in the form of chromium oxide. In the case of embodiments wherein the preliminary oxygen treatment is given prior to the sulfiding, the chromium in a lower valence state, for instance, in the $+3$ state is oxidized to the $+6$ state and water is driven off. Even in instances where the chromium is already in the form of $CrO_3$, it is frequently preferred to heat the material up to the sulfiding temperature in the presence of air. This gives a threefold benefit in that it dries the material to remove water, conserves more expensive nitrogen and results in a better final product since there is some disadvantage to allowing the material at this stage to come in contact with nitrogen at a high temperature since it tends to self-reduce, particularly in the presence of moisture.

One preferred sulfur-containing material is carbon disulfide. Other suitable materials include thiols or polythiols and sulfides or polysulfides which contain hydrocarbyl radicals containing from 1 to about 20 or more carbon atoms. Other exemplary compounds include carbon monosulfide, carbon subsulfide, methanethiol, 2-methyl-1-propanetrithiol, eicosanethiol, benzenethiol, parabenzenedithiol, thiophene-2-thiol, 1,2,3-propanetrithiol, dimethylsulfide, diethylsulfide, diphenylsulfide, benzylphenylsulfide, dimethylsulfide, di-4-tolyldisulfide, 2'-dinaphthyldisulfide, triethyltrisulfide, thiophene, and the like. A sufficient amount of the sulfur compound is employed to react with at least a portion of the chromium present in the supported catalyst to form a chromium sulfide. The amount used can vary over a rather wide range. Generally, a weight ratio of supported catalyst organic sulfur compound ranging from about 100:1 to about 0.1:1, more preferably from about 20:1 to about 0.2:1 have been found suitable for this purpose. If a higher molecular weight sulfur-containing nonoxidizing agent is utilized, it can simply be used to impregnate the catalyst prior to heating instead of being added to the ambient as is done with more volatile sulfur-containing agents.

It is then found particularly beneficial to include an oxygenated compound, such as an alcohol, carboxylic acid or even water vapor with the thiols and sulfides since reproducibility of results is promoted. For instance, a mixture of acetic acid and carbon disulfide can be used. Alternatively, a single material, such as carbonyl sulfide can be utilized which contains both oxygen and sulfur. Generally, a mole ratio of organic sulfur compound to oxygenated compound ranging from about 0.1:1 to 10:1 is employed since consistently high melt index values for polymer produced over such catalysts have been obtained.

Suitable alcohols include saturated and unsaturated aliphatic and aromatic alcohols with boiling points of about 300° C. or less as a matter of convenience. Particularly preferred alcohols from an economic standpoint and ready availability are methanol and isopropanol. These can decompose into $H_2$ and CO.

Suitable carboxylic acids include saturated and unsaturated compounds which are normally liquid as a matter of convenience. A fatty acid, particularly acetic acid, is presently preferred because of ready availability and low cost. These can decompose into various mixtures of C, CO, $CO_2$ and $H_2$.

The sulfiding step can be carried out by fluidizing the dry catalyst (chromium on a silica-containing base) with the nitrogen. This removes air or oxygen if air or oxygen has been used as the ambient for heating to sulfiding temperature. If nitrogen has been used initially, then, of course, the same nitrogen fluidization can continue. It is preferred that the contact of the oxidized catalyst with nitrogen at this elevated temperature before sulfiding be very short, preferably less than 30 minutes, more preferably less than 5 minutes, most preferably about 1 minute or less, i.e. the minimum time required to remove oxygen to prevent self-reduction of the Cr in the catalyst. Also, if an oxygen-containing gas such as air is used in the initial heating, it is essential to remove it since the contact at this temperature between oxygen and sulfur-containing materials such as $CS_2$ might result in uncontrolled oxidation.

The sulfur-containing material is then introduced most conveniently simply by introducing a stream of the sulfur-containing material into the nitrogen stream. After the sulfiding step is complete, the catalyst is adjusted to the reoxidation temperature which may be the same as the sulfiding temperature but which is preferably at least 50° C., more preferably 100°–300° C., lower than the sulfiding temperature.

The reoxidation can take place in any oxidizing ambient containing oxygen, the preferred ambient, of course, being air. Air nitrogen mixtures containing 10–100% air and 0–90% nitrogen can be utilized (gas percentages are all in volume percent). In addition, oxidizing ambients such as $NO_2$, $N_2O$, and oxygen-containing halogen materials such as $I_2O_5$ or $Cl_2O$ can be utilized.

The temperature for the treatment with air prior to sulfiding, if used at all, is generally from room temperature up to the sulfiding temperature, although it is contact with the air at a temperature of 250°–1000° C., preferably 700°–925° C., that is most important. The time can simply be whatever time is required to heat the material to sulfiding temperature and generally will be greater than 5 minutes, preferably 5 minutes to 15 hours, more preferably 20 minutes to 10 hours, most preferably 40 minutes to 3 hours. The heating may be continuous or stopped at any point within the above recited temperature ranges. The temperature for the sulfiding step is within the broad range of 370°–1000° C., preferably 600°–900° C., more preferably 700°–900° C. The times can be relatively short, generally greater than 1 minute, preferably 5 minutes to 10 hours, more preferably 10 minutes to 3 hours.

The subsequent reoxidation temperatures, as noted hereinabove, are preferably lower than those used for the sulfiding and generally will be in the range of 350°–900° C., preferably 450°–700° C.

The time required for the reoxidation is at least 5 minutes, preferably ½ to 10 hours, more preferably 1 to 4 hours.

With regard to the sulfiding temperature being relatively high, it is noted that the chromium is converted to a sulfide at temperatures below 260° C., however, for some unexplained reason, sulfiding temperatures must be substantially higher than this to be effective.

The final catalyst can contain 0–0.5, preferably less than 0.4, more preferably less than 0.3 weight percent S based on the weight of the support.

If hydrocarbons are used at any stage during the activation process, it is generally necessary to follow the hydrocarbon treatment with an ambient containing a relatively low amount of oxygen so as to carefully burn off the carbon.

If desired, the catalyst of this invention can be activated in a continuous activator. For instance, catalyst can be introduced at the top of a compartmentalized vertical activator with the first gas to be used in treating the catalyst being introduced at the bottom of the first (upper) compartment and taken off near the top thereof. The second gas is introduced near the bottom of the second (lower) compartment and taken off near the top thereof and if three or more gases are used, the process can continue in a like manner. In each compartment, the catalyst would be fluidized with the treating medium. Alternatively, two or more compartments could be utilized with the gaseous treating medium, if desired, to increase residence time. An external furnace can heat each compartment to the desired temperature. While a continuous activator was not used to produce the catalysts of the examples set out hereinbelow, the use of a continuous activator was simulated by introducing the catalyst initially into an activator which was at an elevated temperature. It was found that in the embodiments wherein the initial heating is done in a nonoxidizing atmosphere, problems sometimes associated with introducing catalysts in the presence of air into an already heated activator were not encountered.

The catalysts of this invention can be used to polymerize at least one mono-1-olefin containing 2 to 8 carbon atoms per molecule. The invention is of particular applicability in producing ethylene homopolymers and copolymers from mixtures of ethylene and 1 or more comonomers selected from 1-olefins and/or dienes containing 3 to 8 carbon atoms per molecule. Exemplary comonomers include aliphatic 1-olefins, such as propylene, 1-butene, 1-hexene, and the like and conjugated or nonconjugated diolefins, such as 1,3-butadiene, isoprene, piperylene, 2,3-dimethyl-1,3-butadiene, 1,4-pentadiene, 1,7-hexadiene, and the like and mixtures thereof. Ethylene copolymers preferably constitute about 90, preferably 95 to 99 mole percent polymerized ethylene units. Ethylene, propylene, 1-butene and 1-hexene are especially preferred.

The polymers can be prepared from the activated catalysts of this invention by solution polymerization, slurry polymerization, and gas phase polymerization techniques using conventional equipment and contacting processes. However, the catalysts of this invention are particularly suitable in slurry polymerizations for the production of high melt index (MI) polymers, i.e. polymers having MI values in the 8 to 60 range and above in the absence of molecular weight modifiers, such as hydrogen, and with a molecular weight distribution value sufficiently narrow to be of commercial interest for applications such as injection molding. The slurry process is carried out in an inert diluent such as a paraffin, aromatic or cycloparaffin hydrocarbon at a temperature at which the resulting polymer is insoluble. For predominantly ethylene polymers, the temperature is about 66°–110° C. For example, ethylene homopolymers exhibiting a melt index in the 8 to 60 range can be obtained at the polymerization temperatures used in the examples by contact with the catalyst of this invention, whereas otherwise identical catalysts conventionally activated yield 5 to 6 MI polymers or lower. The high MI polymers have HLMI/MI ratio values ranging from about 33 to 38 with $M_w/M_n$ values of about 4 at the polymerization temperatures used in the examples. Such resins can be injection molded in conventional apparatus to form tough, low warpage articles. The MI goes up and the HLMI/MI ratio goes down at higher reactor temperatures. Thus, for any comparison between the invention runs and control runs to be meaningful they must be carried out at the same polymerization temperature.

The catalysts of this invention can be used with conventional cocatalysts such as triethyl aluminum if desired. Also, hydrogen can be used to further increase the MI if desired.

EXAMPLE 1

Unless otherwise indicated, the raw catalyst employed in the activation procedures was a coprecipitated silica-titania gel (cogel) comprising about 2 weight percent titanium, calculated as the metal on a dry basis. Sufficient chromium acetate solution was used to impregnate the wet gel to impart 0.82 weight percent chromium, calculated as the metal on a dry basis of the composite. Following impregnation, the wet composite was dried by means of extraction with liquid ethyl acetate. The resulting dried catalyst is designated as stock catalyst.

A 48 mm O.D. quartz tube was charged in each run with a 50 ml (10.9 g) portion of the stock catalyst. The charge was heated to 1600° F. (871° C.) using a heat-up rate of 3°–5° C. per minute and in the presence of a dry air flow rate of about 42 liters per hour. The flow rate corresponds to a superficial linear velocity at 1600° F. of 0.1 foot (0.3 cm) per second. The air was cut off and dry nitrogen at the same flow rate was substituted for it to flush air from the activator for 1 minute. Then 1 ml (1.26 g) of carbon disulfide was injected onto a glass wool plug located in the bottom of the activator through which nitrogen flowed up to the catalyst. Evaporation of the liquid was complete within 2 to 3 minutes. The weight ratio of catalyst treated to carbon disulfide was about 8.6:1. The treated catalyst was held at 1600° F. in the nitrogen stream for an additional 2 hours after which the activator temperature was lowered to the reoxidation temperature while continuing the nitrogen stream. When the desired temperature was reached, dry air was substituted for the nitrogen and the catalyst was heated in the air stream for 2 hours. Finally, the activator was cooled down while maintaining the air flow and the recovered catalyst was stored for later use.

Portions of each activated catalyst was charged to a reactor containing 1.5 lbs. (682 g) isobutane, ethylene was admitted until 550 psig (3.8 MPa) was reached and polymerization was started. Additional ethylene was admitted on demand during each run as needed. The melt index value given in each run is corrected to 5000 g polymer per g catalyst productivity level to provide a comparative basis for judging the results.

Details of the analyzed sulfur and chromium(VI) contents of each catalyst, reoxidation temperature employed, catalyst color obtained and melt index of polymer made using that catalyst are presented in Table I.

Table I

| | Ethylene Polymerization With Cogel Catalyst Sulfided With $CS_2$ | | | | | |
|---|---|---|---|---|---|---|
| Run No. | Reoxidation Temperature °C. | Weight Percent Sulfur | Percent Cr(VI) | Catalyst Color | Polymer Melt Index | Run Temp. °C. |
| 1 | — | 0.07 | 0 | white | none made | — |
| 2 | — | 0.85 | 0 | black | none made | — |
| 3 | 482 | 0.33 | 0.42 | red brown | 19 | 107 |
| 4 | 593 | 0.24 | 0.48 | red brown | 18 | 107 |
| 5 | 593 | 0.18 | 0.56 | salmon | 20 | 107 |
| 6 | 649[a] | <0.05 | 0.66 | red orange | 25 | 107 |
| 7 | 649[a] | <0.05 | 0.72 | red orange | 27 | 109 |

Notes: [a] Sulfiding was done at 649° C. rather than at 871° C.

Runs 1 and 2 of Table I are control runs. Run 1 shows that the cogel in the absence of any chromium is unchanged in color by the activation treatment and the treated gel is not an active polymerization catalyst. Run 2 shows that the sulfiding treatment turns the cogel containing chromium black in color and that no chromium(VI) is present under such reducing conditions. It is believed that chromium sulfide, $Cr_2S_3$ or CrS, is formed and the results show the composite in that state is not an active polymerization catalyst. Invention catalysts are shown in runs 3–7 after reoxidation of the sulfided composites. The results show that catalysts containing from less than about 0.05 to about 0.3 weight percent sulfur are active ethylene polymerization catalysts when the chromium(VI) content ranges from about 0.4 to about 0.7 weight percent based on the weight of the dry cogel. The invention catalysts all exhibit a characteristic reddish hue after the activation treatment.

EXAMPLE 2

Portions of the stock catalyst described in Example 1 were individually activated in the presence of $CS_2$ at various temperatures and reoxidized in air at various temperatures using the activator and gas flow rates reported earlier. Portions of each catalyst was used to polymerize ethylene as before. Activation conditions employed and results obtained are given in Table II.

Table II

Relationship Of Catalyst Sulfiding Conditions On Polymer Melt Index

| Run No. | Activation Process[1] | Sulfiding Temp., °C. | Reoxidation Temp., °C. | Catalyst Color | Polymerization Run Temp. °C. | Polymerization Run Time (min.) | Polymer Adjusted MI[3] | Polymer HLMI MI | Productivity g/g cat. |
|---|---|---|---|---|---|---|---|---|---|
| 1 | A | 260 | 593 | green | 107 | 77 | 5.4 | 40 | 4810 |
| 2 | A | 399 | 593 | tan | 107 | 38 | 7.1 | 41 | 4900 |
| 3 | A | 538 | 593 | tan | 107 | 48 | 9.5 | 39 | 5120 |
| 4 | B | 538 | 538 | orange | 102 | 80 | 0.08 | 76 | 5140 |
| 5 | B | 649 | 649 | orange | 102 | 46 | 0.47 | 66 | 4270 |
| 6 | A | 649 | 593 | red orange | 107 | 45 | 25 | 37 | 4980 |
| 7 | A | 677 | 593 | red orange | 107 | 43 | 31 | 36 | 5110 |
| 8 | B | 760 | 760 | orange | 102 | 32 | 0.89 | 69 | 4720 |
| 9 | B | 871 | 871 | orange | 102 | 35 | 0.69 | 124[2] | 4710 |
| 10 | A | 871 | 593 | red tan | 102 | 59 | 18 | 44 | 5460 |
| 11 | C | — | — | orange | 102 | 34 | 1.3 | 64 | 5080 |

[1]Activation Process
A. Air to sulfiding temperature, switch to $N_2$ (time too short and temperature too low for any significant self-reduction) and inject 1 ml $CS_2$ into $N_2$ stream, raise temperature to 871° C. and hold at 871° C. while maintaining $N_2$ flow, cool to 593° C. in $N_2$, switch to air and hold for 1 hour, then cool and recover.
B. Air to sulfiding temperature, switch to $N_2$ and inject 1 ml $CS_2$ into $N_2$ stream, hold 2 hours in $N_2$ at that temperature, switch to air and hold additional 2 hours at that temperature, then cool and recover. Results not as good because best results are obtained when the sulfiding temperature is relatively high and the reoxidation temperature is lower. In procedure A, although the listed sulfiding temperatures are sometimes as low or lower, it was always raised to 871° C.
C. Control air activation at 871° C. with no sulfiding.
[2]Probably experimental error.
[3]Adjusted slightly to 5000 g/g productivity based on correlations between MI and productivity.

In considering Table II, the results in runs 1, 2, 3, 6, 7 and 10 reveal at identical conditions, except for increasing temperature during sulfiding, that a sulfiding temperature of about 600°–700° C. is about optimum for activation process A in which reoxidation at 593° C. in air was observed. Runs 1 and 2 show that under the conditions employed, sulfiding temperatures ranging from about 260° to about 399° C. are too low thus only minimal benefits in improving melt index capability of catalyst are realized. When the sulfiding temperature reaches about 538° C., run 3 shows that a moderate improvement in catalyst melt index capability is occurring. On the other hand, sulfiding temperatures of about 871° C., based on polymer results, are more favorable than those at 538° C. but less favorable than those at about 650°–700° C.

Runs 4, 5 and 8, 9 demonstrate that activation process B is ineffective in improving melt index capability of catalyst even when sulfiding and reoxidation is employed. These runs employ a combination of the less preferred techniques of the invention in that the sulfiding temperature is relatively low (i.e. never reaches the most preferred level of at least 700° C.) and the reoxidation temperature is not lower than the sulfiding temperature. Finally, the polymerization temperature is low. The broader molecular weight distribution is due to lower reactor temperature.

It is concluded therefore, that catalyst sulfiding should occur at least about 538° C. more preferably about 600°–700° C. Following this treatment, the catalyst should be heated to about 871° C. in an inert gas as nitrogen, then reoxidized at about 600° C. in an oxygen-containing medium in order to maximize the melt index capability benefits to be expected.

Control run 11 shows a typical result for a cogel catalyst (which represents the best of the prior art catalysts) without sulfiding.

EXAMPLE 3

Portions of the stock catalyst of Example 1 were individually activated in the presence of an organic sulfide compound alone and in the presence of an oxygen-containing organic compound or water. After reoxidation in air, the recovered catalyst was employed in ethylene polymerization as before. The compounds and activation conditions employed and results obtained are presented in Table III. All reoxidations were conducted at 1100° F. unless indicated otherwise.

TABLE III

Ethylene Polymerization Over Sulfided and Reoxidized Catalysts

| Run No. | Activation[1] Process |سulfiding Agent Type | (g) | Weight Ratio Catalyst Sulfiding Agent | Component 2 Type | (g) |
|---|---|---|---|---|---|---|
| 1 | A | methanethiol | 30 | 0.4:1 | none | — |
| 2 | B | diethyl disulfide | 0.99 | 11:1 | none | — |
| 3 | B | diethyl disulfide | 0.99 | 11:1 | none | — |
| 4 | B | dimethyl sulfide | 0.85 | 13:1 | none | — |
| 5 | B | dimethyl sulfide | 0.42 | 26:1 | methanol | 0.40 |
| 6 | B | dimethyl sulfide | 0.42 | 26:1 | acetic acid | 0.52 |
| 7 | B | dimethyl disulfide | 0.20 | 54:1 | none | — |
| 8 | B | dimethyl disulfide | 0.50 | 22:1 | none | — |
| 9 | B | dimethyl disulfide | 0.99 | 11:1 | none | — |
| 10 | B | dimethyl disulfide | 0.50 | 22:1 | acetic acid | 0.52 |
| 11 | B | dimethyl sulfite | 1.0 | 11:1 | none | — |
| 12 | B | sulfur | 2 | 5:1 | none | — |
| 13[2] | B | carbon disulfide | 1.3 | 8:1 | none | — |
| 14 | B | carbon disulfide | 1.3 | 8:1 | none | — |
| 15 | B | carbon disulfide | 1.3 | 8:1 | $H_2O$ | 0.5 |
| 16 | B | carbon disulfide | 0.63 | 17:1 | methanol | 0.40 |
| 17 | B | carbon disulfide | 0.63 | 17:1 | acetic acid | 0.52 |
| 18 | C | carbon disulfide | 1.3 | 8:1 | (CO) | |

TABLE III-continued

Ethylene Polymerization Over Sulfided and Reoxidized Catalysts

| Run No. | | | Sulfiding Agent Component 2 | Mole Ratio | Polymerization Run Time (min)[4] | Polymer Adjusted MI | HLMI MI | Productivity g/g catalyst |
|---|---|---|---|---|---|---|---|---|
| 19[3] | D | | carbon disulfide | 1.3 | 8:1 | (CO) | | |
| 20[3] | E | | carbon disulfide | 1.3 | 8:1 | (benzene) | 0.88 | |
| 1 | | | — | | 48 | 16 | 40 | 5430 |
| 2 | | | — | | 38 | 34 | 32 | 4710 |
| 3 | | | — | | 85 | 4.2 | 43 | 5370 |
| 4 | | | — | | 59 | 9.9 | 42 | 5320 |
| 5 | | | 0.5:1 | | 50 | 24 | 35 | 4780 |
| 6 | | | 0.8:1 | | 45 | 22 | 30 | 4770 |
| 7 | | | — | | 34 | 9.6 | 41 | 4620 |
| 8 | | | — | | 52 | 12 | 47 | 5000 |
| 9 | | | — | | 67 | 5.6 | 45 | 5060 |
| 10 | | | 0.6:1 | | 53 | 19 | 47 | 5050 |
| 11 | | | — | | dead | — | — | — |
| 12 | | | — | | 57 | 6.7 | 43 | 5100 |
| 13[2] | | | — | | 59 | 18 | 44 | 5460 |
| 14 | | | — | | 50 | 9.1 | 37 | 5150 |
| 15 | | | 0.6:1 | | 28 | 21 | 36 | 5310 |
| 16 | | | 0.7:1 | | 52 | 18 | 37 | 5180 |
| 17 | | | 0.9:1 | | 40 | 28 | 31 | 4940 |
| 18 | | | | | 35 | 20 | 36 | 4650 |
| 19[3] | | | | | 63 | 12 | 42 | 4890 |
| 20[3] | | | 1.5:1 | | 51 | 7.9 | 43 | 5000 |

[1] Activation Process
A. Air to 1200° F.; 5 min. $N_2$ flush; $CH_3SH$ gas (42 l/hr for 20 min) at 1200° F. switch to $N_2$, raise temperature to 1600° F. and hold 2 hours; lower temperature in $N_2$ to 1000° F.; switch to air and hold 2 hours at 1100° F.; cool and recover catalyst.
B. Air to 1600° F.; 1 min. $N_2$ flush; inject additives into $N_2$ stream; hold in $N_2$ for 2 hours; lower temperature in $N_2$ to 1100° F.; switch to air and hold 1 hour at 1100° F.; cool and recover catalyst.
C. Air to 1600° F.; 1 min. $N_2$ flush; inject 1 ml $CS_2$ $N_2$ stream; hold in $N_2$ about 10 min; switch to CO and hold in CO for 2 hours at 1600° F.; flush with $N_2$, lower temperature to 1200° F.; switch to air and hold 2 hours; cool and recover catalyst.
D. Same procedure as C except treating order in $CS_2$ and CO is reversed.
E. Air to 1600° F.; 1 min. $N_2$ flush; 1 ml benzene injected in $N_2$ stream; hold in $N_2$ about 10 min; lower temperature in $N_2$ to 1200° F.; switch to air and hold for 2 hours at 1200° F.; cool and recover catalyst.
[2] Run 10 of Table II repeated here.
[3] Note that catalyst is treated with component 2 before component 1.
[4] All runs at 225° F. (107° C.).

Inspection of Table III shows in runs 1, 2, 5, 6 and 8 that active catalysts result when one of the compounds listed is used in sulfiding the catalyst. However, erratic results have been noted with respect to large deviations in expected polymer melt index produced with such catalysts. Run 2 polymer MI is 34 whereas run 3 is 4.2, both polymers being produced from catalyst prepared in a similar way but in separate runs. This effect is illustrated with another sulfiding agent in runs 13 and 14. The addition of an oxygen containing organic compound or even water during sulfiding has eliminated the problem, resulting in generally reproducible results from run to run. This is illustrated, for example, in runs 15, 16 and 17 which are comparable with run 13. Runs 18-20 illustrate a two step reducing stage for catalyst activation followed by reoxidation. Melt index capability of the catalyst is improved by such treatment although no pronounced advantage is apparent over the procedure employed with a single organic sulfur compound. In comparing runs 18 and 19 in a two step reducing stage employing an organic sulfur compound and CO, the best results are obtained (run 18) when the catalyst is contacted with the organic compound prior to contact with CO.

EXAMPLE 4

Based on the results obtained in Example 3, another series of sulfided and reoxidized catalyst samples was prepared. Since oxygen containing organic compounds generally decompose into CO, $H_2$ and C at about 1600° F., this suggests that sulfiding is best carried out in the presence of CO. Carbonyl sulfide (COS) is a convenient source of both sulfur and CO when it decomposes at about 1600° F. Catalyst was prepared by sulfiding samples of the stock catalyst of Example 1 with a mixture of 10 mole percent COS in nitrogen, for various times at 1600° F. and reoxidized in air at 1100° F. Each recovered catalyst was used to polymerize ethylene as before. The activating conditions employed and results obtained are presented in Table IV.

Table IV

Ethylene Polymerization Over Catalysts Sulfided With COS

| Run No. | COS Treatment | | Weight Ratio Catalyst/COS | Polym. Run Time min. | Polymer | | Productivity g/g cat. |
|---|---|---|---|---|---|---|---|
| | min. | g (nominal) | | | Adjusted MI | HLMI MI | |
| 1 | 15 | 2.8 | 3.9:1 | 52 | 13 | 45 | 5420 |
| 2 | 30 | 5.6 | 1.9:1 | 40 | 34 | 34 | 5240 |
| 3 | 60 | 11 | 1:1 | 30 | 45 | 33 | 5350 |
| 4 | 120 | 22 | 0.5:1 | 54 | 36 | 35 | 5230 |

All runs at 225° F. (107° C.) reactor temperature.

Activating process consisted of heating catalyst in air to 1600° F.; 1 min. $N_2$ flush; inject sufficient COS into N₂ stream to obtain a mixture containing 10 mole % COS and contact catalyst for the specified time; continue heating in N₂ only for 2 hours; reduce temperature to 1100° F. in N₂; switch to air and hold for 2 hours at 1100° F; cool and recover catalyst.

The melt index results in Table IV clearly demonstrate the efficacy of an activation treatment comprising sulfiding the catalyst with carbonyl sulfide and reoxidizing it. Under the conditions employed, run 3 shows the activation process yielded a catalyst that in particle form ethylene polymerization produced an ethylene holopolymer exhibiting a melt index of 45.

In summary, the activation treatment disclosed in this invention yields catalysts which in contact with ethylene in a particle form polymerization process at 225° F. (107° C.) are capable of routinely producing polyethylene which have melt index values in the 30 to about 50 range. The polymers are shown by gel permeation chromatographs to have rather narrow molecular weight distributions, i.e. 3.9 for a 20 melt index polymer (this is the ratio of weight average molecular weight to number average molecular weight, i.e. $M_w/M_n$ and can be found by GPC). This value approaches the values obtained for similar melt index polymers made in a solution process. The high melt index narrow molecular weight distribution polymers made with the invention catalysts appear to be quite suitable for injection molding, for example.

The sulfiding procedure is satisfactorily carried out in quartz or ceramic activators. However, since metal embrittlement may result at the high temperatures employed in the presence of the organic sulfur compounds caution is indicated when activators constructed of certain metals or metal alloys such as Inconel are employed.

EXAMPLE 5

The purpose of this example is to show the relative values for melt index (with other variables held constant) for (1) the best prior art catalyst, a titanium cogel with ordinary air oxidation, (2) CO treatment which is an improvement over the basic catalyst and is the subject of a separate invention, and (3) the sulfiding of this invention. The stock catalyst, in each instance, was a nominal 2 percent titanium cogel with a nominal 1 percent chromium content as in the prior Examples. The data are set out in Table V.

limited thereby but is intended to cover all changes and modifications within the spirit and scope thereof.

We claim:

1. A process for activating a catalyst consisting essentially of a chromium component and a silica-containing base comprising a first step wherein said catalyst is contacted with a sulfur-containing ambient at a temperature of at least 370° C. and a subsequent second step wherein it is contacted with an oxygen-containing oxidizing ambient at a temperature within the range of 400°-900° C.

2. A method according to claim 1 wherein said catalyst is heated in the presence of oxygen prior to said contact with said sulfur-containing ambient.

3. A method according to claim 2 wherein after said heating in the presence of oxygen, a nitrogen ambient is introduced to flush out the air prior to said introduction of said sulfur-containing ambient.

4. A method according to claim 3 wherein said nitrogen flush is carried out for less than 30 minutes.

5. A method according to claim 2 wherein said contact with said sulfur-containing ambient is at a temperature within the range of 600°-900° C. and said reoxidation is carried out at a temperature within the range of 450°-700° C., which reoxidation temperature is also at least 50° C. lower than said temperature for contact with said sulfur-containing ambient.

6. A method according to claim 5 wherein said contact with said sulfur-containing ambient is for a time within the range of 10 minutes to 3 hours and said reoxidation step is carried out for a time within the range of 1 to 4 hours.

7. A method according to claim 1 wherein said catalyst is heated in air to a temperature within the range of 250°-1000° C. over a time period of at least 5 minutes prior to said contact with said sulfur-containing ambient.

8. A method according to claim 1 wherein said sulfur-containing ambient comprises a sulfur-containing material and an oxygen-containing compound.

9. A method according to claim 8 wherein said oxygen-containing compound is selected from acetic acid, methanol or water vapor and said sulfur-containing material is selected from dimethyl sulfide, methylmercaptan, diethyl sulfide, and carbon disulfide.

10. A method according to claim 1 wherein said sul-

Table V

| Run No. | CO Treatment Temp. °C. | COS Treatment Temp. °C. | Reoxidation Temp. °C. | Air Activation Temp. °C. | Polymerization Run Time min. | Polymerization Run Temp. °C. | Polymer Adjusted MI | Polymer HLMI MI | Productivity g/g Catalyst |
|---|---|---|---|---|---|---|---|---|---|
| 1 | — | — | — | 871 | 75 | 107 | 2.8 | 46 | 5620 |
| 2 | 871 | — | 650 | — | 62 | 107 | 9.1 | 36 | 4850 |
| 3 | — | 871 | 593 | — | 30 | 107 | 45 | 33 | 5350 |

Each of runs 1, 2 and 3 are run under essentially optimum conditions for that system. As can be seen, invention run 3 gave a melt index of 45 which is almost five times that of control run 2 and sixteen times control run 1. To further put this in perspective, control run 1 represents the best of the prior art chromium oxide systems, MI values of less than 1 being obtained with ordinary chromium on silica catalysts under these conditions.

While this invention has been described in detail for the purpose of illustration, it is not to be construed as fur-containing ambient comprises carbon disulfide 11. A method according to claim 1 wherein said sulfur-containing ambient comprises carbonyl sulfide.

12. A method according to claim 1 wherein said silica-containing base is a cogel formed by adding a titanium compound to a mineral acid, introducing a alkali metal silicate into the acid containing said titanium compound to form a hydrogel, aging the hydrogel for a time of greater than one hour, washing the thus aged hydrogel to produce a substantially alkali metal free hydrogel, forming a mixture comprising the thus washed hydrogel and a normally liquid oxygen-containing water soluble organic compound, and separating said organic compound and water from said mixture to form a xerogel, and wherein said chromium is imparted by impregnation of said hydrogel with an aqueous chromium acetate solution.

13. A method according to claim 1 wherein said resulting reoxidized catalyst contains less than 0.4 weight percent sulfur.

14. A method according to claim 1 wherein said contacting with said sulfur-containing ambient and said subsequent contact with an oxygen-containing ambient is carried out in a continuous activator.

15. A process according to claim 1 wherein said silica-containing base is a silica-titania cogel containing about 2 weight percent titania based on the weight of said cogel, said chromium-containing compound being present in an amount sufficient to give about 0.5 to 1 weight percent chromium based on the weight of said base, said sulfur-containing ambient is carbonyl sulfide and wherein said contacting with said carbonyl sulfide is carried out at a temperature within the range of 600°–900° C. for a time within the range of 10 minutes to 3 hours and wherein said oxidizing ambient is air and said contact with said air is carried out at a temperature within the range of 450°–700° C. for a time within the range of 1 to 4 hours and wherein said chromium-containing catalyst is heated in air at a temperature within the range of 700°–925° C. prior to said contact with said carbonyl sulfide.

16. A catalyst produced by the method of claim 15.

17. A catalyst produced by the method of claim 1.

* * * * *